US009548049B2

(12) United States Patent
McCullough et al.

(10) Patent No.: US 9,548,049 B2
(45) Date of Patent: Jan. 17, 2017

(54) METHODS AND SYSTEMS FOR INTEGRATION OF SPEECH INTO SYSTEMS

(71) Applicant: HONEYWELL INTERNATIONAL INC., Morristown, NJ (US)

(72) Inventors: Sue McCullough, Phoenix, AZ (US);
David Bibby, Scottsdale, AZ (US);
Mahesh Sivaratri, Karnataka (IN);
Minni Ambooken, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 22 days.

(21) Appl. No.: 14/184,327

(22) Filed: Feb. 19, 2014

(65) Prior Publication Data
US 2015/0235640 A1  Aug. 20, 2015

(51) Int. Cl.
G10L 15/08 (2006.01)
G10L 17/22 (2013.01)
G10L 21/10 (2013.01)

(52) U.S. Cl.
CPC ............. *G10L 15/08* (2013.01); *G10L 17/22* (2013.01); *G10L 21/10* (2013.01)

(58) Field of Classification Search
CPC .......... G10L 15/08; G10L 21/10; G10L 17/22
See application file for complete search history.

(56) References Cited

U.S. PATENT DOCUMENTS

| 7,881,832 | B2 | 2/2011 | Komer et al. |
| 8,234,121 | B1 | 7/2012 | Swearingen |
| 8,311,827 | B2 | 11/2012 | Hernandez et al. |
| 8,719,244 | B1* | 5/2014 | Pasca ............................. 707/706 |
| 2003/0158736 | A1 | 8/2003 | James et al. |
| 2003/0212543 | A1* | 11/2003 | Epstein ................. G06F 17/271 704/9 |
| 2008/0201148 | A1 | 8/2008 | Desrochers |
| 2010/0077346 | A1* | 3/2010 | Kawashima et al. ......... 715/802 |
| 2013/0030804 | A1* | 1/2013 | Zavaliagkos et al. ........ 704/235 |

FOREIGN PATENT DOCUMENTS

EP   2131154 A2   12/2009

OTHER PUBLICATIONS

Mark Draper, et al.; Manual Versus Speech Input for Unmanned Aerial Vehicle Control Station Operations; Proceedings of the Human Factors & Ergonomics Society's 47th Annual Meeting, Oct. 2003, pp. 109-113.
EP Extended Search Report for Application No. EP 15153710.7 dated Jul. 20, 2015.
Lefebvre, Y., "Understanding ARINC 661 and the Benefits of 661-Based Development Tools," PRESAGIS, pp. L-20, XP002659657, Jun. 27, 2008.
"Use of Voice Integrated with Aircraft Cockpit Displays," SID International Symposium, pp. 227-230 Jun. 5-7, 1984.
EP Examination Report for Application No. 15153710.7-1901 dated Nov. 14, 2016.

* cited by examiner

Primary Examiner — Qian Yang
(74) Attorney, Agent, or Firm — Lorenz & Kopf, LLP

(57) ABSTRACT

A method of managing speech data in a system is provided. The method includes receiving speech data that is generated by a speech recognition module; searching data structures of a definition file for a speech tag based on the speech data, wherein the data structures define features of a display screen; and determining an action associated with the speech tag; and at least one of communicating data to an application of the system and generating display data based on the action.

14 Claims, 7 Drawing Sheets

METHODS AND SYSTEMS FOR INTEGRATION OF SPEECH INTO SYSTEMS

TECHNICAL FIELD

The present disclosure generally relates to methods and systems for integrating speech recognition into systems, and more particularly relates to methods and systems of integrating speech recognition into computing systems of an aircraft.

BACKGROUND

Speech systems perform, among other things, speech recognition based on speech uttered by users of the system. The speech utterances typically include commands that communicate with or control one or more features of the system. Speech systems of aircraft related applications typically require specific semantic phraseology, ATC like phraseology, and/or specific speech commands. Thus, in order to use the system, flight crews are required to memorize and learn the phraseology, which is a major limitation and heavy burden on pilots.

In addition, development of such systems can be difficult. For example, in order to recognize the specific speech phraseology a complex and intelligent parser must be developed. In another example, the complex and intelligent parsers must be able to take in to account variants of the phraseology. These variants may be introduced, for example, when a pilot is under stress. In still another example, each time a new feature in the application is introduced, the semantic phraseology changes thus causing the complex and intelligent parsers to require modification.

Hence, there is a need for improved systems and methods for integrating speech recognition into existing systems. Other desirable features and characteristics will become apparent from the subsequent detailed description and the appended claims, taken in conjunction with the accompanying drawings and the foregoing technical field and background.

BRIEF SUMMARY

In one embodiment, a method is provided managing speech data in a system. The method includes receiving speech data that is generated by a speech recognition module; searching data structures of a definition file for a speech tag based on the speech data, wherein the data structures define features of a display screen; and determining an action associated with the speech tag; and at least one of communicating data to an application of the system and generating display data based on the action.

In another embodiment, a system is provided for managing speech data in a computing system of an aircraft. The system includes an information datastore that stores a definition file that is associated with an aircraft related application, wherein the definition file includes data structures that define features of display screens associated with the aircraft related application. A computer module receives speech data, searches the data structures of the definition file for a speech tag based on the speech data, and communicates data to the aircraft related application or generates display data based on an action associated with the speech tag.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
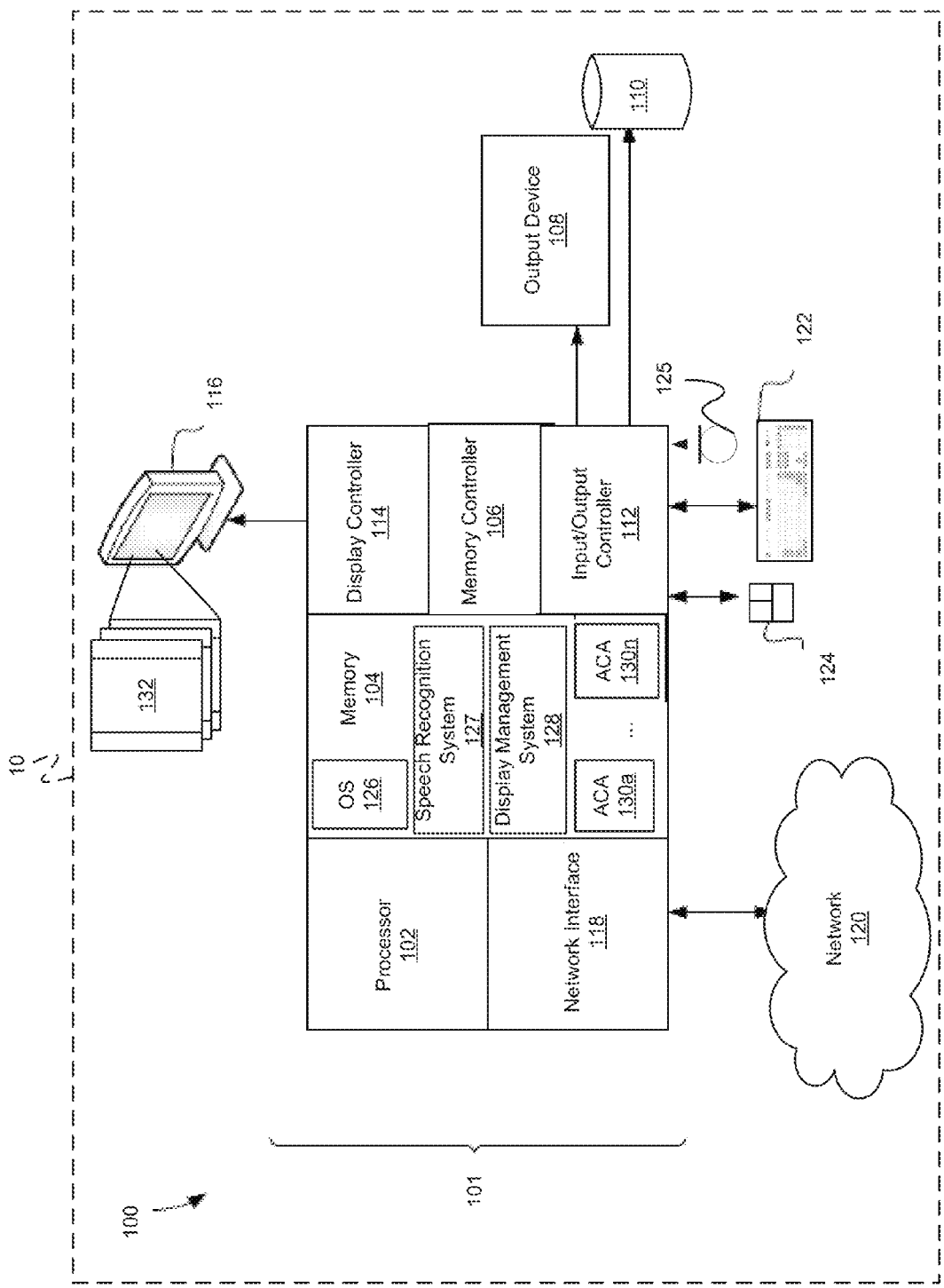
FIG. 1 is a functional block diagram illustrating a computing system of an aircraft that includes speech recognition capabilities in accordance with exemplary embodiments.

Referring now to FIG. 1, exemplary embodiments of the present disclosure are directed to a computing system shown generally at 100 that is associated with an aircraft 10. As can be appreciated, the computing system 100 described herein can be implemented in any system having a display device. For exemplary purposes, the disclosure will be discussed in the context of a computing system 100 for an aircraft 10.

Turning now to FIG. 1 in greater detail, the exemplary computing system 100 is shown to include a computer 101. As can be appreciated, the computing system 100 can include any computing device, including but not limited to, a desktop computer, a laptop, a server, a portable handheld device, or any other electronic device that includes a memory and a processor. For ease of the discussion, the disclosure will be discussed in the context of the computer 101 of the aircraft 10. As can be appreciated, the computer 101 may be located in a cockpit (not shown) of the aircraft 10 for use by, for example, a pilot of the aircraft 10 or in any other location of the aircraft 10 for use by any other individual associated with the aircraft 10.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122, a mouse 124, and a microphone 125 and any other input devices can be coupled to the input/ output controller 112. In an exemplary embodiment, the computing system 100 can further include a network interface 118 for coupling to a network 120. The network 120 transmits and receives data between the computer 101 and external systems (not shown).

In various embodiments, the memory 104 stores instructions that can be performed by the processor 102. The instructions stored in memory 104 may include one or more separate programs, each of which comprises an ordered listing of executable instructions for implementing logical functions. When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

In the example of FIG. 1, the instructions stored in the memory 104 include an operating system (OS) 126, a speech recognition system 127, a display management system 128, and one or more aircraft related applications 130a-130-n, among other systems or applications (not shown). As can be appreciated, in various other embodiments, all or parts of the speech recognition system 127, the display management system 128, and the aircraft related applications 130a-130n can be implemented on a separate storage medium (not shown) or other computing devices (not shown), such as a server or other computing device, and can communicate with the computer 101. For exemplary purposes, the disclosure will be discussed in the context of the systems and applications 127-130n all being implemented entirely on the computer 101.

In general, the operating system 126 essentially controls the performance of computer programs and provides scheduling, input-output control, file and data management, memory management, and communication control and related services. The speech recognition system 127 receives speech input (e.g., from a user interacting with the microphone 125, or from other systems) and performs one or more speech recognition methods on the speech input to identify the speech input. The display management system 128 essentially controls the content of what is being displayed by the display controller 114 and the display 116. In the current example, the display management system 128 controls aircraft related interactive display screens 132 such as, but not limited to, flight control screens, aircraft maintenance screens, aircraft informational screens, etc. The display management system 128 also manages the inputs received from a user interacting with the interactive display screens 132 via the input devices 122-125 and interfaces with the aircraft related applications 130a-130n based on the inputs.

In various embodiments, the display management system 128 receives output from the speech recognition system 127 as one of the inputs. The output from the speech recognition system 127, for example, may be a textual representation of a recognized command that was spoken by a user of the computing system 100 or that was provided by another system. The display management system 128 manages the display of the interactive display screens 132 and interfaces with the aircraft related applications 130a-130n based on the output from the speech recognition system 127. Thus, the computing system 100 of the aircraft 10 is enhanced with speech recognition capabilities through features of the display management system 128. By enhancing the computing system 100 with speech recognition through the display management system 128, the aircraft related applications 130a-130n do not require any modifications.

Figure 2:
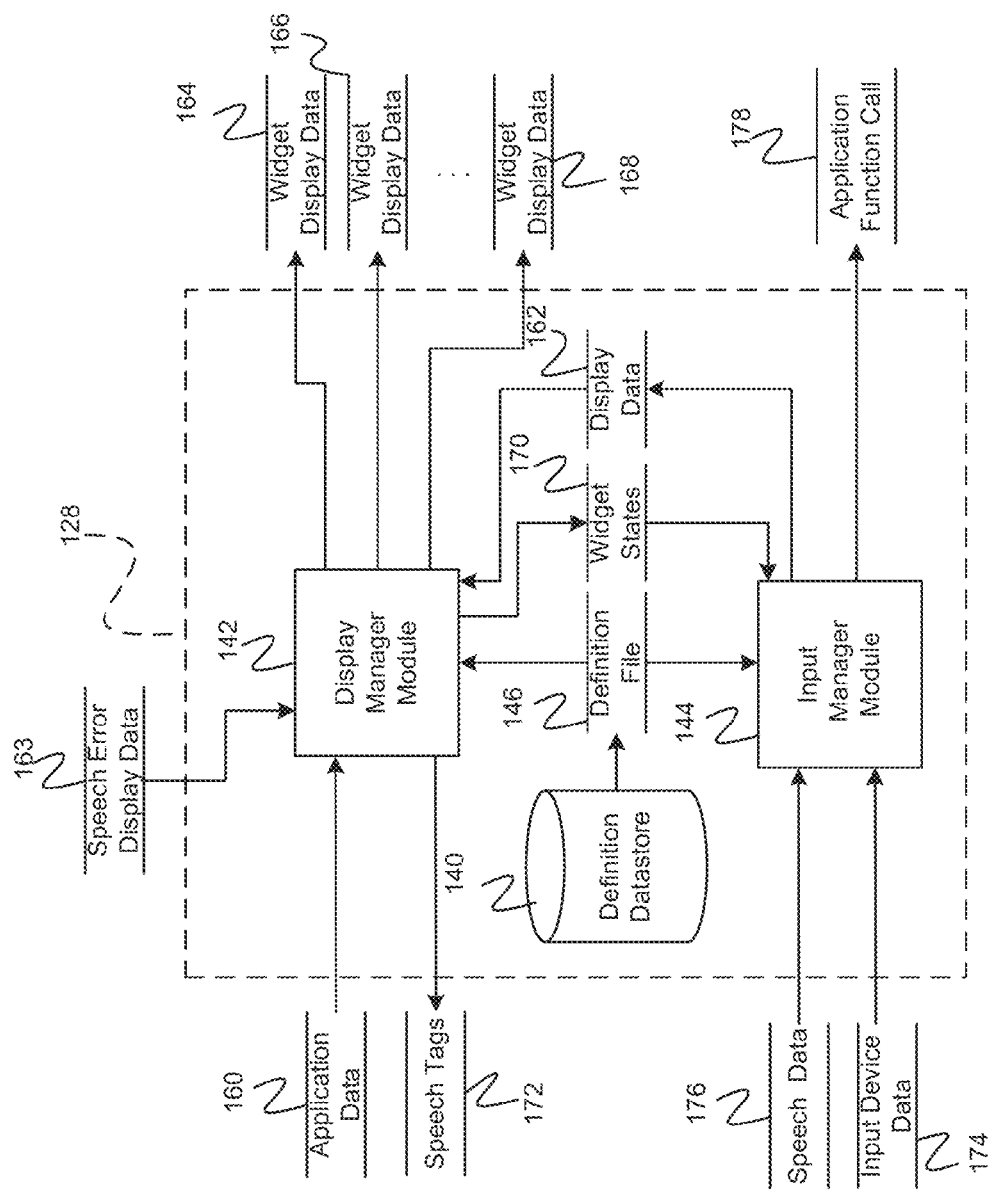
FIGS. 2 and 3 are dataflow diagrams illustrating a display management system and a speech recognition system of the computing system in accordance with exemplary embodiments.
Figure 3:
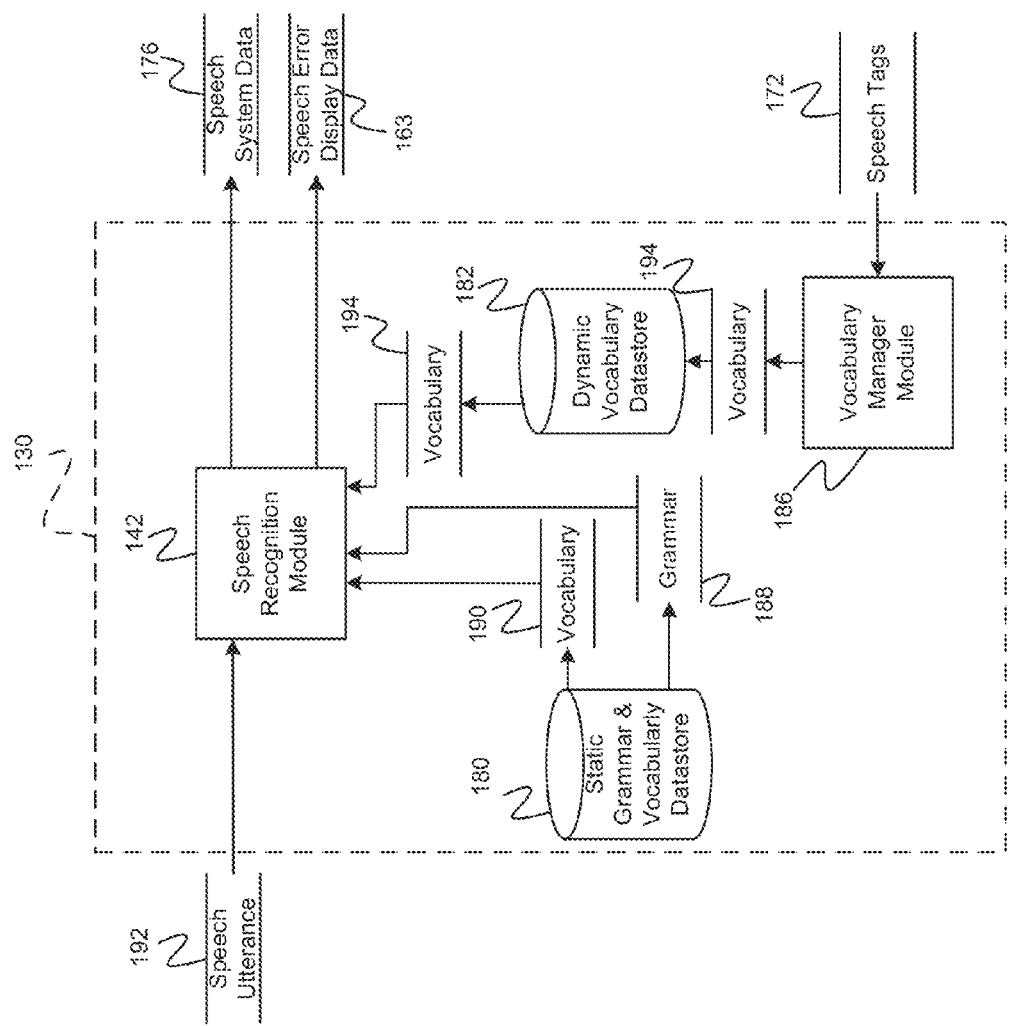

Referring now to FIGS. 2 and 3, and with continued reference to FIG. 1, a dataflow diagram illustrates various embodiments of the display management system 128 and the speech recognition system 127. Various embodiments of display management systems 128 and speech recognition systems 127 according to the present disclosure may include any number of modules. As can be appreciated, the modules shown in FIGS. 2 and 3 may be combined and/or further partitioned to similarly manage the interactive display screens 132 and the user inputs. Inputs to the display management system 128 and the speech recognition system 127 may be received from other modules (not shown), determined/modeled by other sub-modules (not shown), and/or may be user input that is based on a user interacting with the interactive display screens 132 through one or more input devices 122-125.

With particular reference now to FIG. 2, in various embodiments, the display management system 128 includes a definition datastore 140, a display manager module 142, and an input manager module 144. The definition datastore 140 stores definition files 146 that define interactive display screens 132 that are associated with the aircraft related applications 130a-130n. The definition files 146 each include one or more data structures that define features of the various interactive display screens 132 associated with the aircraft related applications 130a-130n. The features can be static (e.g., a text or graphical display feature) or dynamic (e.g., text entry boxes or selection items). The features can be display features of the interactive display screen or can be functions associated with the interactive display screen (e.g., hidden functions that can be performed by a display screen, such as a repeat command function, backspace function, or other function).

In various embodiments, the features can be implemented as widgets of a display screen. In such embodiments, the data structures include parameters that define the widgets. For example, the parameters can define a location of the widget on the screen, define an appearance of the widget on the screen, and/or can define any actions that are associated with the widget. An exemplary data structure for, a push button type widget is as follows:

| Parameters | Change | Description |
| --- | --- | --- |
| Commonly used parameters | | |
| WidgetType | D | PUSH_BUTTON |
| WidgetIdent | D | Unique identifier of the widget |
| ParentIdent | D | Identifier of the immediate container of the widget |
| Visible | DR | Visibility of the widget |
| Enable | DR | Ability of the widget to be activated |

-continued

| Parameters | Change | Description |
|---|---|---|
| StyleSet | DR | Reference to predefined graphical characteristics inside CDS |
| PosX | D | The X position of the widget reference point |
| PosY | D | The Y position of the widget reference point |
| SizeX | D | The X dimension size (width) of the widget |
| SizeY | D | The Y dimension size (height) of the widget |
| ApplyIndex | D | Order of the widget for focus circulation |
| AutomaticApplyMotion | D | Automatic motion of the focus on widget specified in NextFocusedWidget parameter |
| | | Specific parameters |
| Alignment | D | Alignment of the text within the label area of the widget: Left, Right, Center |
| LabelString | DR | String of the push button |
| MaxStringLength | D | Maximum length of the label text |
| | | Speech Parameters |
| SpeechApply | D | Reference to the Speech Command to give this Widget Focus |
| SpeechSelected | D | Reference to the Speech Command to Select the Button |

An exemplary data structure for a text edit box type widget is as follows:

| Parameters | Change | Description |
|---|---|---|
| | | Commonly used parameters |
| WidgetType | D | A661_EDIT_BOX_TEXT |
| WidgetIdent | D | Unique identifier of the widget |
| ParentIdent | D | Identifier of the immediate container of the widget |
| Visible | DR | Visibility of the widget |
| Enable | DR | Ability of the widget to be activated |
| StyleSet | DR | Reference to predefined graphical characteristics inside CDS |
| PosX | D | The X position of the widget reference point |
| PosY | D | The Y position of the widget reference point |
| SizeX | D | The X dimension size (width) of the widget |
| SizeY | D | The Y dimension size (height) of the widget |
| FocusIndex | D | Order of the widget for focus circulation |
| AutomaticFocusMotion | D | Automatic motion of the focus on widget specified in NextFocusedWidget parameter |
| | | Specific parameters |
| MaxStringLength | D | Maximum size of the String |
| LableString | DR | Text of the Edit box |
| StartCursorPos | DR | Start position of cursor in field when entering edit mode |
| Alignment | D | Justification of the label text within the edit box area: CENTER LEFT RIGHT |
| ReportAllChanges | D | CDS will report each update from the crew member while in edit mode |
| | | Speech Parameters |
| SpeechApply | D | Reference to the Speech Command to give this Widget Focus |
| SpeechEntry | D | Reference to the Speech Command to Accept the Entry |
| SpeechCancel | D | Reference to the Speech Command to Exit focus mode without modification. |

An exemplary data structure for a scroll panel type widget is as follows:

| Parameters | Change | Description |
|---|---|---|
| | | Commonly used parameters |
| WidgetType | D | A661_SCROLL_PANEL |
| WidgetIdent | D | Unique identifier of the widget |
| ParentIdent | D | Identifier of the immediate container of the widget |

| Parameters | Change | Description |
| --- | --- | --- |
| Visible | DR | Visibility of the widget |
| StyleSet | DR | Reference to predefined graphical characteristics inside CDS |
| Enable | DR | Ability of the widget to be activated |
| PosX | D | The X position of the widget reference point |
| PosY | D | The Y position of the widget reference point |
| SizeX | D | The X dimension size (width) of the widget |
| SizeY | D | The Y dimension size (height) of the widget |
| | | Specific parameters |
| LineDeltaX | D | Increment/Decrement to apply to FrameX when line scroll controls are activated. |
| LineDeltaY | D | Increment/Decrement to apply to FrameY when line scroll controls are activated. |
| PageDeltaX | D | Increment/Decrement to apply to FrameX when page scroll controls are activated |
| PageDeltaY | D | Increment/Decrement to apply to FrameY when page scroll controls are activated |
| HomeX | D | X predefined position for the frame |
| HomeY | D | Y predefined position for the frame |
| FrameX | DR | Frame Origin co-ordinate on x axis. |
| FrameY | DR | Frame Origin co-ordinate on y axis. |
| SizeXSheet | D | X dimension size of the sheet |
| SizeYSheet | D | Y dimension size of the sheet |
| BoundX | DR | Scroll Boundary Origin co-ordinate on x axis. |
| BoundY | DR | Scroll Boundary Origin co-ordinate on y axis. |
| SizeXBound | DR | X dimension size of the Scroll boundary |
| SizeYBound | DR | Y dimension size of the Scroll boundary |
| | | Speech Parameters |
| SpeechApply | D | Reference to the Speech Command to give this Widget Focus |
| SpeechScrollUp | D | Reference to the Speech Command to Scroll Upwards |
| SpeechScrollDown | D | Reference to the Speech Command to Scroll Downwards |

As shown, each of the data structures for the widgets include speech related attributes or tags. The speech tags define a string of characters that are associated with an action of the widget. The action, for example, may cause a certain function to be performed. In various embodiments, the string is associated with the names or labels displayed on the widgets, and/or can be simple functions that can be performed with the widget based on the widget type. By keeping the strings simple (as opposed to complex phraseology), the recognition techniques performed by the speech recognition system 127 can be simplified and improved. For example, the simple strings can be: ENTER, CONFIRM, CHECK, SELECT, SCROLL UP, SCROLL DOWN or any other string that may be easily identified by a user of the system when viewing the display screen. As will be described in more detail below, the string is compared with the output from the speech recognition system 127 to determine the appropriate action.

Figure 4:
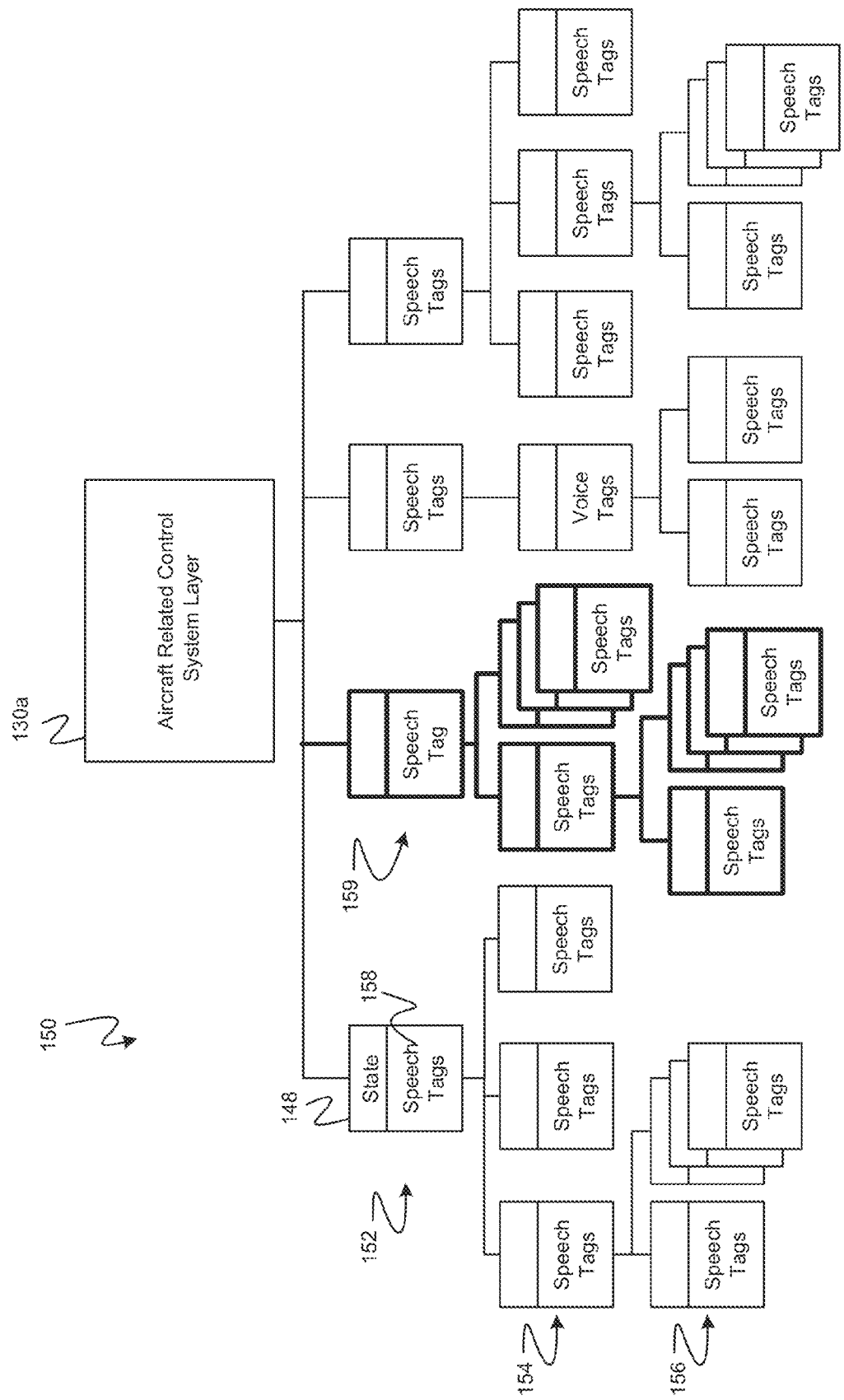
FIG. 4 is an illustration of a tree structure used by the computing system in accordance with exemplary embodiments.

In various embodiments, the definition files 146 store the data structures or widgets in a hierarchical fashion based on their relationships with a particular interactive display screen 132. For example, as shown in FIG. 4, data structures or widgets 148 of display screens for a particular aircraft related application 130*a* are stored as a tree data structure (referred to hereinafter as a "widget tree" 150) with various levels 152-156 of association. As shown, each widget 148 includes a speech tag 158 for comparison to the output from the speech recognition system 127 (FIG. 1). The bolded widgets 159 indicate the currently visible widgets 148, as will be discussed in more detail below.

With reference back to FIG. 2, the display manager module 142 receives as input application data 160, display data 162, and speech system error data 163. The application data 160 is data received, for example, from an active aircraft related application 130*a* and indicates a particular display screen to be displayed or specific data to be displayed in a display screen. The particular display screen to be displayed may be based on, for example, a state of the active aircraft related application 130*a*. The display data 162 is data received, for example, from the input manager module 144 that indicates a particular display screen to be displayed. The particular display screen to be displayed in this case, may be based on, for example, an input from the user interacting with the interactive display screen 132 (FIG. 1) via an input device 122-125 (FIG. 1). The speech system error data 163 is data received, for example, from the speech recognition system 127 and indicates a particular interactive display screen to be displayed and/or specific error data to be displayed in the interactive display screen.

Based on the data 160-163, the display manager module 142 selects and loads a definition file 146 that is associated with the active aircraft related application 130*a*. The display manager module 142 then selectively displays an interactive display screen 132 for the active aircraft related application 130*a* that includes any supplied data (through the application data 160, the display data 162, or the speech system error data 163). For example, the display manager module 142 generates widget display data 164-168 such that certain widgets are displayed based on their definition in the definition file 146. The display manager module 142 generates the widget display data 164-168 based on their association with a particular interactive display screen 132 (FIG. 1) to be displayed as defined in the definition file 146.

The display manager module 142 further maintains a state 170 of all the widgets that are created during the loading of the definition file 146. For example, the display manager module 142 sets the state 170 of each widget to visible or invisible. If the widget is currently being displayed, the state 170 is set to visible; and if the widget is not currently being displayed, the state 170 is set to invisible. The display manager module 142 further generates a list of speech tags 172 that includes the speech tags of the visible widgets or alternatively the speech tags of all of the widgets. This list of speech tags 172 is used by the speech recognition system 127 (FIG. 1) as will be discussed in more detail below.

The input manager module 144 receives as input device data 174, speech data 176, and the states 170 of the widgets. The input device data 174 is received, for example, from one or more of the input/output controller 112 based on a user's interaction with the input devices 122-124 (e.g., the keyboard 122, the mouse 124, etc.). The speech data 176 is received, for example, from the speech recognition system 127 and can be generated based on, for example, a user speech generated by a user interacting with the microphone 125, or speech generated by another system.

Upon receipt of the input device data 174 or the speech data 176, the input manager module 144 determines an appropriate response. The response can be, for example, to communicate information to the active aircraft related application 130a or can be to cause a new display screen, feature, or data associated with the feature to be displayed. The input manager module 144 determines the appropriate response based on a comparison of the data 174, 176 to the tags of the widgets stored in the definition file 146.

In various embodiments, the input manager module 144 determines the appropriate response by traversing the widget tree 150 (FIG. 3) of the definition file 146 in a hierarchical fashion for the first visible widget, as indicated by the widget states 170 (shown as the bolded widgets 159 in FIG. 3). If the input is input device data 174, the input manager module 144 traverses the widget tree 150 (FIG. 3) searching the data structures of the visible widgets 159 for an input tag that matches the input device data 174. If the input is the speech data 176, the input manager module 144 traverses the widget tree 150 (FIG. 3) searching the data structures of the visible widgets for a speech tag that matches the speech data 176.

In various embodiments, the input manager module 144 traverses the widget tree 150 (FIG. 3) by evaluating the visible widget 159 (FIG. 3) at the first level 152 (FIG. 3), and if a match is not found then evaluating the visible widgets 159 (FIG. 3) at the next level 154 (FIG. 3), and if a match is not found then evaluating the visible widgets 159 (FIG. 3) at the next level 156 (FIG. 3), and so on until a match is found. If, however, a match is not found in the visible widgets 159 (FIG. 3), the input manager module 144 may generate the display data 162 such that an error message may be generated by the display manager module 142.

If, however, a match is found, the input manager module 144 generates either the display data 162 for use by the display manager module 142, or application data 178 that is for use by the active aircraft related application 130a. For example, the input manager module determines the action that is associated with the matched tag based on the type of widget for the matched tag and generates the display data 162 or the application data 178 based on the action.

For example, if the speech tag 158 (FIG. 3) is "APPLY" and the speech tag 158 (FIG. 3) is associated with a pushbutton type widget, the application data 178 may include event selection data that is sent to the aircraft related application 130a, as if it had been selected (e.g., by clicking on it using a mouse or other user input device). In another example, if the speech tag 158 (FIG. 3) is "ENTRY" and the speech tag is associated with a text edit box type widget, the application data 178 may include event entry data that is sent to the aircraft related application 130a, as if it had been entered by the user (e.g., by typing it in using a keyboard or other user input device).

In various embodiments, the input manager module 144 retains the last matched tag (either from the user input device data 174 or the speech data 176) that is used if the speech system input indicates to repeat the previous action (e.g., the speech data 176 is "AGAIN" or "REPEAT"). In such a case, if the speech data 176 matches the predefined tag (e.g., "AGAIN" or "REPEAT"), then the action associated with the last matched tag is determined and the display data 162 or the application data 178 is generated.

With particular reference now to FIG. 4, in various embodiments, the speech recognition system 127 includes a static grammar and vocabulary datastore 180, a dynamic vocabulary datastore 182, a speech recognition module 184, and a vocabulary manager module 186. The static grammar and vocabulary datastore 180 stores a static grammar 188 and a static vocabulary 190 used in the processing of a speech utterance 192. The grammar 188 and vocabulary 190 are static in that they remain relatively unchanged, with the exception of updates that are due to learning techniques that may performed by the speech recognition module 184 during speech processing. The dynamic vocabulary datastore stores a vocabulary 194 based on information from the display management system 128 (FIG. 2). For example, a new vocabulary 194 is stored every time input is received from the display management system 128 (FIG. 1) indicating that the content of the interactive display screen 132 (FIG. 1) has changed.

The speech recognition module 184 receives as input the speech utterances 192 that are either spoken by a user of the system 100 (FIG. 1) or that are provided to the system 100 (FIG. 1) from another system. The speech recognition module 184 processes the speech utterance 192 based on speech recognition techniques known in the art. The speech recognition module 184 processes the speech utterance 192 using the grammar 188, the static vocabulary 190, and the dynamic vocabulary 194 stored in the datastores 180, 182. If the speech recognition module 184 is able to recognize the speech utterance 192, the speech recognition module 184 generates the speech data 176 that includes the recognized speech for use by the display management system 128 (FIG. 2). If, however, the speech recognition module 184 is unable to recognize the speech utterance 192, the speech recognition module 184 generates the speech error display data 163 for use by the display management system 128 (FIG. 2) to display an error message.

The vocabulary manager module 186 receives as input the list of speech tags 172 that are generated by the display management system 128 (FIG. 2). The vocabulary manager module 186 updates the dynamic vocabulary datastore 182 with the vocabulary 194 defined by the list of speech tags 172. For example, in the case that the list of speech tags 172 includes only the visible speech tags, the vocabulary manager module 186 replaces the stored vocabulary that was associated with the speech tags of what was previously displayed, with the new vocabulary that is associated with the speech tags of what is currently being displayed.

Figure 5:
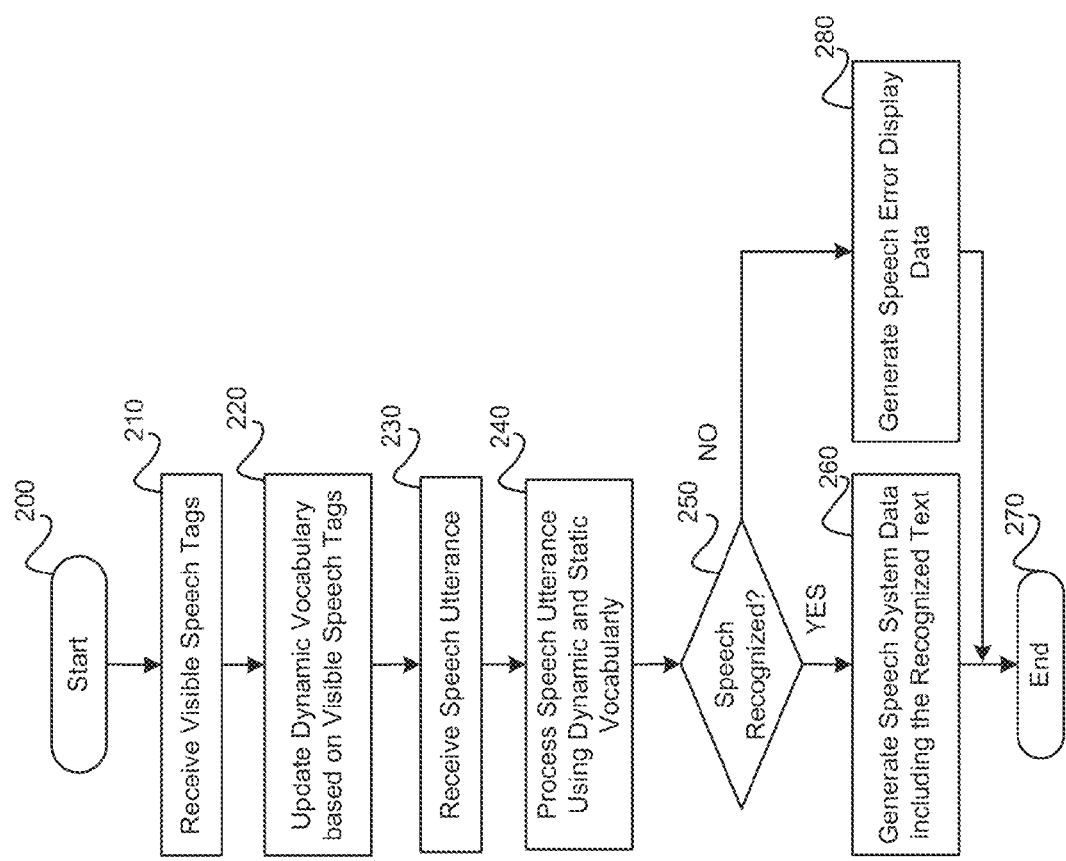
FIGS. 5-7 are flowcharts illustrating methods that may be performed by the computing system in accordance with exemplary embodiments.
Figure 6:
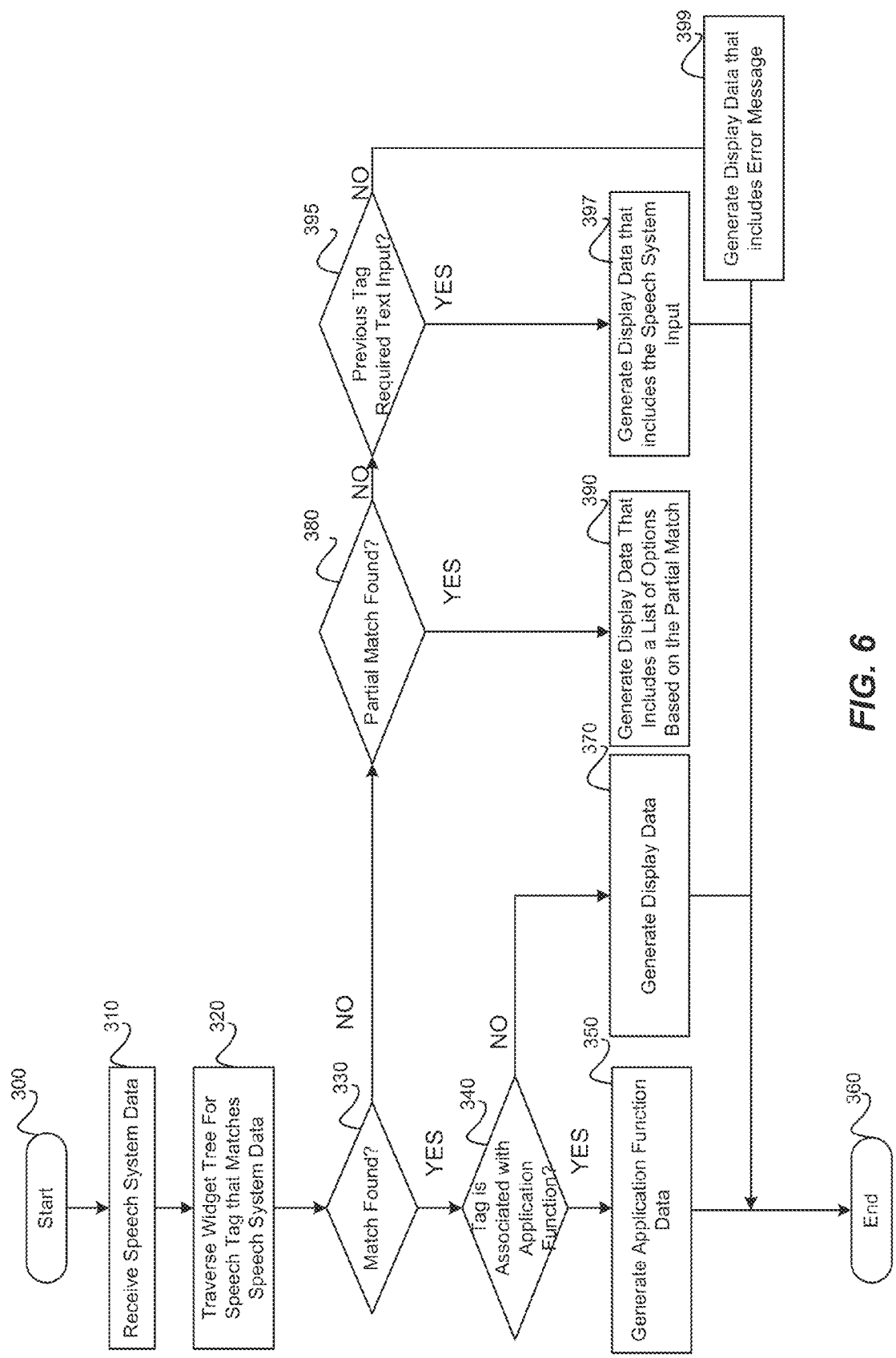
Figure 7:
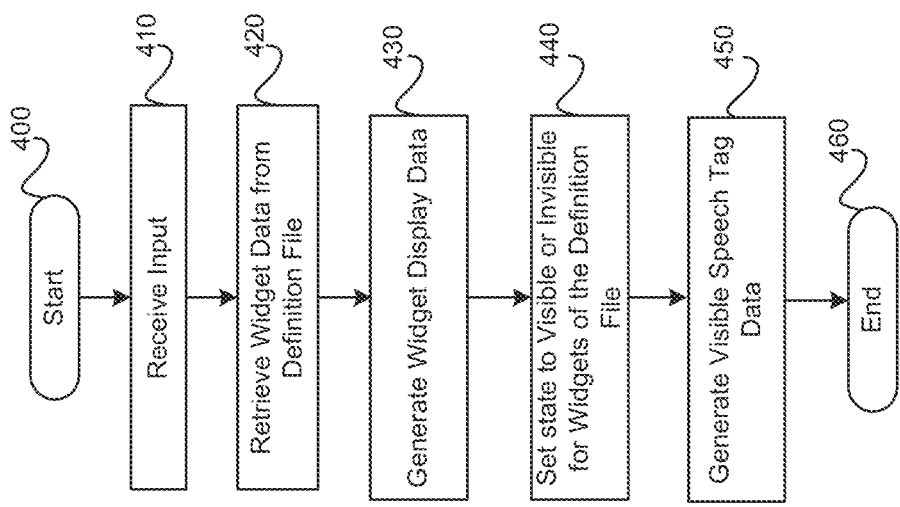

Referring now to FIGS. 5-7, and with continued reference to FIGS. 1 through 4, flowcharts illustrate methods that can be performed by the speech recognition system 127 and the display management system 128 in accordance with various embodiments. As can be appreciated in light of the disclosure, the order of operation within the methods is not limited to the sequential execution as illustrated in FIGS. 5-7, but may be performed in one or more varying orders as applicable and in accordance with the present disclosure.

In various embodiments, the methods can be scheduled to run based on predetermined events, and/or can run continually during operation of the computing system 100 of the aircraft 10. With particular reference to FIG. 5, a speech recognition method that may be performed by the speech recognition system 127 is shown.

In one example, the method may begin at 200. The speech tags of the widgets are received (as list of speech tags 172) at 210. The dynamic vocabulary datastore is updated with the dynamic vocabulary 194 based on the list of speech tags 172 at 220.

Thereafter, a speech utterance 192 is received at 230. The speech utterance 192 is processed using the static vocabulary, the static grammar, and the dynamic vocabulary at 240. If processing produces a recognized result at 250, the speech data 176 is generated that includes the recognized result at 260 and the method may end at 270. If, however, the processing does not produce a recognized result at 250, the speech error display data is generated at 280. Thereafter, the method may end at 270.

With particular reference to FIG. 6, a speech input processing method that may be performed by the input manager module 144 of the display management system 128 is shown. In one example, the method may begin at 300. The speech data 176 is received at 310. The widget tree 150 is traversed at 320 in search of a speech tag 158 that matches the speech data 176. If a match is found at 330, the action associated with the speech tag 158 is evaluated at 340. If the action is associated with a function of the aircraft related application 130a, the application data 178 is generated for use by the aircraft related application 130a at 350, and the method may end at 360. If, however, the action is not associated with a function of the aircraft related application 130a at 340, rather the action is associated with a display feature, the display data 162 is generated for the display feature at 370, and the method may end at 360.

If, at 330, a match is not found, it is determined whether a partial match is found at 380. If a partial match is found at 380, display data is generated that includes a list of possible matches that can be selected at 390. Thereafter, the method may end at 360.

If, at 330, a match is not found and a partial match is not found at 380, it is determined whether the previously matched tag required a subsequent input (e.g., a text entry input upon selection of a text edit box) at 395. If the previously matched tag required a subsequent input at 395, the display data 162 is generated that includes the speech data 176 for displaying the input at 397, and the method may end at 360. If however a match is not found at 330 and at 380 and the previously matched tag did not require a subsequent input at 395, the method may end at 360. Optionally, display data may be generated that includes an error message (e.g., "Speech Command Not Recognized") at 399.

With particular reference to FIG. 7, a display management method that may be performed by the display manager module 142 of the display management system 128 (FIG. 2) is shown. In this example, the display management system includes in the list of speech tags 172 only the visible widgets. In one example, the method may begin at 400. The data is received (either application data 160 or the display data 162) at 410. The data structures are retrieved from the definition file 146 at 420. The widget display data 164-168 is generated based on the data structures at 420. The states 170 for the visible and invisible widgets are tracked at 440. If a state of a widget has changed, the list of speech tags 172 is generated at 450 based on the visible widgets, and the method ends at 460. If, however, a state has not changed, the method may simply end at 460.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of managing speech data in a system, comprising:
    maintaining a definition datastore that stores in a tree structure a plurality of data structures that define features of a displayed interface, each data structure including a speech tag that comprises a string of characters that is associated with a name, a label, or a function of the feature;
    receiving speech data that includes translated text that has been generated by a speech recognition module;
    hierarchically searching, by a processor, the data structures of the tree structure for a speech tag that matches the text of the speech data, wherein the hierarchical searching comprises evaluating a state of the features associated with the data structures for visibility;
    determining an action associated with the speech tag; and
    at least one of communicating data to an application of the system and generating display data based on the action.

2. The method of claim 1, wherein the state is at least one of visible and invisible.

3. The method of claim 1, further comprising tracking the states of the features that are being displayed, and wherein the searching is based on the tracked states of the features.

4. The method of claim 1, updating a vocabulary of the speech recognition module based on the speech tag.

5. The method of claim 4, performing speech recognition techniques on a speech utterance based on the updated vocabulary.

6. The method of claim 1, wherein the generating the display data comprises generating data that is to be displayed in the display screen.

7. The method of claim 1, wherein the generating the display data comprises generating display data to display a new display screen.

8. The method of claim 1, wherein the generating the display data comprises generating display data to alter an appearance of a feature of the display screen.

9. The method of claim 1, wherein the feature of the display screen is a hidden feature.

10. The method of claim 1, wherein the feature of the display screen is a displayed feature.

11. A system for managing speech data in a computing system of an aircraft, comprising:
    an information datastore that stores a definition file that is associated with an aircraft related application, wherein the definition file includes a tree structure including a plurality of data structures that define features of a displayed interface associated with the aircraft related application, each data structure including a speech tag that comprises a string of characters that is associated with a name, a label, or function of the feature; and
    a computer module that receives speech data, that hierarchically searches, by a processor, the data structures of the tree structure for a speech tag that matches the text of the speech data, wherein the hierarchical search comprises evaluating a state of the features associated with the data structures for visibility, and that communicates data to the aircraft related application or generates display data based on an action associated with the speech tag.

12. The system of claim 11, wherein the state is a display state of visible or invisible.

13. The system of claim 11, wherein the computer module updates a vocabulary of a speech recognition module based on the state of features that are being displayed, and generates the speech data based on the vocabulary.

14. The system of claim 11, wherein the display data includes at least one of data to be displayed in the display screen, data to alter an appearance of a feature of the display screen, and data to display a new display screen.

* * * * *